US009321851B2

(12) United States Patent
Bhargava et al.

(10) Patent No.: US 9,321,851 B2
(45) Date of Patent: Apr. 26, 2016

(54) WATER SOLUBLE POLYMER POWDER FORMULATION HAVING IMPROVED DISPERSING PROPERTIES

(75) Inventors: Prachur Bhargava, Wilmington, DE (US); Glen T. Carroll, Norristown, PA (US); Tuyen T. Nguyen, Newark, DE (US); Kostantin A. Vaynberg, Cherry Hill, NJ (US)

(73) Assignee: HERCULES INCORPORATED, Wilmington, DE (US)

( * ) Notice: Subject to any disclaimer, the term of this patent is extended or adjusted under 35 U.S.C. 154(b) by 575 days.

(21) Appl. No.: 13/412,075

(22) Filed: Mar. 5, 2012

(65) Prior Publication Data

US 2012/0247367 A1 Oct. 4, 2012

Related U.S. Application Data

(60) Provisional application No. 61/449,846, filed on Mar. 7, 2011.

(51) Int. Cl.
*C08J 3/24* (2006.01)
*C08L 1/26* (2006.01)
*C08B 15/00* (2006.01)
*C09D 101/26* (2006.01)
*C08K 5/098* (2006.01)
*C08L 1/28* (2006.01)
*C09D 101/28* (2006.01)
*C08K 5/09* (2006.01)
*C08L 33/02* (2006.01)

(52) U.S. Cl.
CPC ............... *C08B 15/005* (2013.01); *C08K 5/098* (2013.01); *C08L 1/26* (2013.01); *C08L 1/284* (2013.01); *C09D 101/26* (2013.01); *C09D 101/284* (2013.01); *C08K 5/09* (2013.01); *C08L 33/02* (2013.01)

(58) Field of Classification Search
CPC ...... C08J 2301/26; C08J 3/24; C08J 2301/28; C08J 2301/30; C08B 11/20; C08B 15/005; C08L 1/26; C08L 1/284; C09D 101/26; C09D 101/284; C08K 5/09; C08K 5/098
USPC ...................... 106/181.1, 184.1, 189.1, 198.1
See application file for complete search history.

(56) References Cited

U.S. PATENT DOCUMENTS

| 2,879,268 | A |   | 3/1959  | Jullander |
|-----------|---|---|---------|-----------|
| 4,366,070 | A | * | 12/1982 | Block ........................... 507/114 |
| 4,720,303 | A |   | 1/1988  | Soldatos |
| 5,837,864 | A |   | 11/1998 | Andersson et al. |
| 6,172,010 | B1 |  | 1/2001  | Argillier |
| 6,197,100 | B1 |  | 3/2001  | Melbouci |
| 6,639,066 | B2 |  | 10/2003 | Bostrom et al. |
| 8,303,159 | B2 |  | 11/2012 | Yu et al. |
| 2003/0130500 | A1 |  | 7/2003 | Schlesiger |
| 2005/0261490 | A1 |  | 11/2005 | Perplies et al. |
| 2007/0055057 | A1 |  | 3/2007 | Brackhagan |
| 2007/0175361 | A1 |  | 8/2007 | Bonney et al. |
| 2011/0218678 | A1 |  | 9/2011 | Sebben |
| 2013/0233205 | A1 | * | 9/2013 | Bhargava .................. C08L 1/28 106/501.1 |

FOREIGN PATENT DOCUMENTS

| DE | 10239442 | 3/2004 |
| EP | 1316563 | 6/2003 |
| GB | 1161953 | 8/1969 |
| GB | 2126243 | 3/1984 |
| JP | 2000 063565 A1 | 2/2000 |
| KR | 2010 0118801 A | 11/2010 |
| WO | 95 30705 | 11/1995 |
| WO | WO 2012/122153 | 9/2012 |

OTHER PUBLICATIONS

International Search Report, PCT/US2012/027826, mailed Jun. 4, 2012.
Schutte & Koerting, "Educators and Syphons", 2007.
International Search Report, PCT/US2013/043601 (WO/2014/175903), Nov. 12, 2013.

* cited by examiner

*Primary Examiner* — David M Brunsman
(74) *Attorney, Agent, or Firm* — Dunlap Codding, P.C.; Shaorong Chen

(57) ABSTRACT

The present invention relates generally to water soluble polymer powder formulations, and more particularly, to a cellulose ether formulation which in powder form is suitable for direct addition to water-based systems to produce smooth, lump free solutions. The cellulose ethers are crosslinked with an aldehyde crosslinker and include a dry weak acid which slows hydrolysis of the hermiacetal linkage formed by the crosslinker. The selected acid does not adversely affect solubility stability.

18 Claims, 4 Drawing Sheets

WATER SOLUBLE POLYMER POWDER FORMULATION HAVING IMPROVED DISPERSING PROPERTIES

RELATED APPLICATION

This application is related to and claims the benefit of U.S. Provisional Patent Application Ser. No. 61/449,846, filed Mar. 7, 2011, the disclosure of which is incorporated herein by reference.

FIELD OF THE INVENTION

The present invention relates generally to water soluble polymer powder formulations, and more particularly, to cellulose ether formulations which in powder form is suitable for direct addition to water-based systems to produce smooth, lump free solutions. The invention additionally concerns a process for producing water soluble cellulose ether formulations in powder form suitable for direct addition to water-based systems. The water soluble cellulose ether powder formulations are of use in personal care, household care, building and construction materials, oilfield, pharmaceutical, food, and most particularly paint and coatings.

BACKGROUND OF THE INVENTION

In many end use applications, water soluble polymers are received and initially handled by users as powders which are subsequently dissolved into various water-based systems. This, however, presents a technical challenge as water soluble polymer powders tend to lump when added to water-based systems. The problem arises from rapid hydration and swelling of the water soluble polymer powders upon addition to water-based systems. When water soluble polymer powders are added in bulk, particles of the water soluble polymer at the interface between powder phase and fluid phase begin to rapidly hydrate and swell. The swelling of water soluble polymer particles at the interface and the resulting particle jamming slows down fluid penetration into the interior of the powder phase. This process ultimately results in the creation of persistent, slowly dissolving gel agglomerates of various sizes. The formation of said agglomerates in addition to slowing down the rate of water soluble polymer dissolution, also results in the presence of undesired matter in one's formulation.

A number of approaches are known in the art that have been used in producing lump free dissolution of water soluble polymers. Among the commonly-used approaches are (a) slow addition of water soluble polymer powder, (b) pre-wetting of the water soluble polymer powders with water miscible solvent, and (c) blending the water soluble polymer powder with other dry material prior to utilization. Each of the above mentioned approaches has a downside. For example, approach (a) greatly slows down powder utilization, approaches (b) and (c) may carry over substantial concentrations of additives which may have negative effects on the product to which the water soluble polymer product was added from either an environmental compliance or a performance standpoint.

Another approach used in suppressing lump formation during dissolution is based on using high shear induction equipment. In this approach, the water soluble polymer powder/water system mixtures are subjected to high shear that mechanically breaks lumps formed by the hydrating water soluble polymer powder into individual polymer particles. The shortcoming of this approach is that it requires dedicated equipment at the point of use.

A number of approaches, based on physical or chemical modification of water soluble polymer powders, have also been developed in order to attempt to provide for lump free dissolution of water soluble polymers. For example, U.S. Pat. No. 6,197,100 teaches the use of surfactants which when coated onto particle surfaces make the coated particles more easily dispersible. Patent application US2007/0175361A teaches a method of preparation of dispersible water soluble polymers by means of spray drying of the water soluble polymer powders with water soluble salts or sugars or various polymers.

U.S. Pat. No. 2,879,268 teaches a method for improving dispersibility of powders by means of chemical modification of powder surface. The patent teaches the use of formaldehyde or dialdehydes to produce surface cross-linking which allows particle dispersion prior to its solubilization.

U.S. Pat. No. 6,639,066 B2 teaches the use of blended glyoxalated cellulose ethers with various electrolytic salts. The dry blends are taught to be suitable for preparing stable suspensions by adding the dry blends to water in a single step.

U.S. Pat. No. 4,720,303 teaches the use of blends of cellulose ethers with solid organic acids, such as citric acid, tartaric acid, oxalic acid, malonic acid and succinic acid, to produce dry blends suitable for thickening water-based systems without lump formation. However, blending cellulose ethers with solid organic acids, appear to have a detrimental effect on the cellulose ether, especially hydroxyethylcellulose. Such blends of solid organic acids and cellulose ethers exhibit a decrease in the blend's shelf stability which manifests in a decrease in the solubility of the polymer.

The need exists for an approach for suppressing lump formation of water soluble cellulose ethers during dissolution which does not require the use of specialized high shear induction equipment, or through the use of additives which are either detrimental to the ultimate end use or to the shelf life of the cellulose ether, but rather results in cellulose ether powders which are capable of rapid, lump free dissolution from a direct addition to water-based systems without the disadvantage of compromised shelf stability.

BRIEF DESCRIPTION OF THE INVENTION

The present invention relates to a dry blend comprising: up to about 99 wt % by weight of an aldehyde-reactive water soluble cellulose ether treated with up to about 8 wt % of a crosslinker having at least one aldehyde moiety, and 20 wt % by weight or less of a weak acid which provides storage stability to the crosslinked cellulose ether.

The present invention also relates to a method of thickening water-based systems, preferably water-based systems having a viscosity higher than the viscosity of water. The method comprises the steps of adding a desired amount of a dry blend to a water-based system. The water-based system is subsequently mixed wherein a relatively lump free uniform thickened system is formed. The dry blend used in this method includes up to about 99 wt % by weight of a water soluble cellulose ether crosslinked with up to about 8 wt % by weight of a crosslinker having at least one aldehyde group, preferably glyoxal, and 20 wt % by weight or less of a weak acid which provides storage stability to the dry blend in powder form.

The invention will be further appreciated in light of the following detailed description and figures, in which:

DETAILED DESCRIPTION OF THE INVENTION

Figure 1:
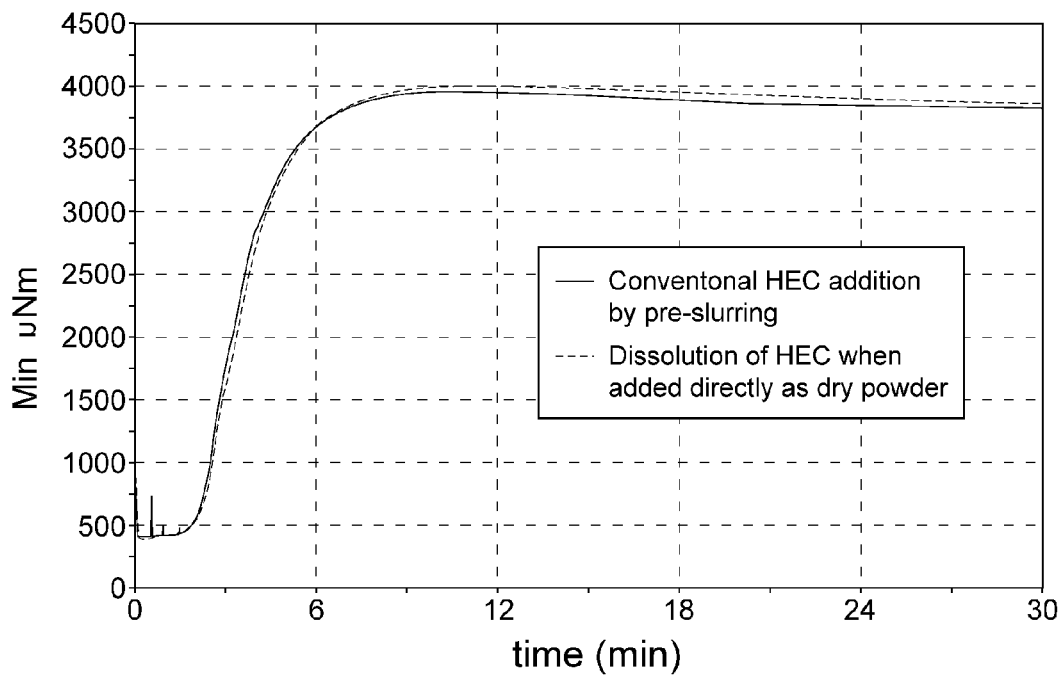
FIG. 1 is a graph which illustrates dissolution over time of glyoxalated HEC in pH8.5 100 mM Tris buffer by either pre-slurrying or directly adding the HEC as a dry powder.

The claimed invention relates to the formulation of polyaldehyde-reactive water soluble cellulose ether powders suitable for direct addition to water-based systems, preferably water-based systems having a viscosity greater than the viscosity of water, under moderate agitation where the formulation readily dispenses without lumps. The formulation includes a cellulose ether, a crosslinker and a powdered acid.

For the purposes of this application, "powder" shall mean a substance consisting of ground, pulverized or otherwise finely dispersed solid particles.

The cellulose ethers for use in the present invention include cellulose ethers which react with an aldehyde to form a hemiacetal, in particular hydroxyalkyl cellulose ethers. These include hydroxy ethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methylcellulose (MC), methylhydroxypropyl cellulose (MHPC), methylhydroxyethyl cellulose (MHEC), carboxymethylmethylcellulose (CMMC), hydrophobically modified carboxymethylcellulose (HMCMC), hydrophobically modified hydroxyethyl cellulose (HMHEC), hydrophobically modified hydroxylpropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxy ethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC). In the present invention, HEC is a preferred cellulose ether.

The cellulose ether powder is treated with small amounts of a crosslinker. The crosslinking is carried out under conditions such that only a slight amount of formation of cross-linkages takes place, according to the method set forth in U.S. Pat. No. 2,879,268, the disclosure of which is incorporated herein by reference in its entirety. The concentration of the crosslinker in the cellulose ether powder is up to about 8% by weight, preferably between about 0.01 to 5% by weight.

The crosslinker is a multifunctional molecule having at least a first and a second reactive moiety, at least one of the reactive moieties being an aldehyde which will react with the pendent hydroxyl group of the cellulose ether having forming a hemiacetal bond. The second reactive moiety can be a wide variety of different groups that will react with the cellulose ether, preferably the pendent hydroxyl group of the cellulose ether. These reactive groups include carboxyls, silanols, isocyanates, halomethyl, alkyl tosylate ether, and epoxide. The crosslinker may be a dialdehyde such as glyoxal. Glyoxalated cellulose ethers are commercially available.

The powdered acid for use in the present invention will be a water soluble powdered acid which effectively lowers the pH of water contacting the cellulose ether during dispersion to reduce the rate of hydrolysis of the hemiacetal bond between the crosslinker and the cellulose ether. This allows the cellulose ether to disperse in water before the particles of cellulose ether absorb too much water, creating lumps. Further, the acid must not be so reactive that it reduces the solubility stability of the cellulose ether during storage conditions by reacting with the cellulose ether causing the formation of a water insoluble cellulose ether. "Solubility stable" is defined as the ability of cellulose ethers to remain soluble upon accelerated aging where the said polymer is subjected, in a sealed system, to 60° C. exposure for at least 3 days, generally for at least 10 days or more, preferably 14 days or more.

Therefore, the acid must be one that provides storage stability of the crosslinked cellulose ether. Generally, such acids will be weak acids having a pKa of greater than 2 and less than 7.5. "pKa" is defined as the negative of the logarithm of the acid group dissociation constant Ka, measured under dilute aqueous solution and 25° C. conditions. Acids with higher pKas do not sufficiently protect the crosslinked cellulose ethers from hydrolysis. Certain water soluble polymeric acids useful in the present invention include water soluble polyacrylic acid, water soluble polymethacrylic acid, polymaleic acid, water soluble acids formed from monomers reacted with acrylic acid, methacrylic acid or maleic acid, as well as polyvinyl sulfonic acid, polyastartic and copolymers of the above monomers (for example, Gantrez®). Other acids such as monosodium phosphate, trisodium pyrophosphate, and certain amino acids such as alanine, can also be used alone or in combination with other acids.

One class of weak acids suitable for use in the present invention are partially neutralized polycarboxylic acids. Partially neutralized polycarboxylic acid shall be defined as having at least one carboxylic acid group which has been neutralized and at least one carboxylic acid group which has not been neutralized. Neutralization herein is directed to a process wherein carboxylic moieties of the solid polycarboxylic acid are neutralized by means of a counter ion. Examples of such counter ions are Na+, K+, NH4+ and the like.

The partially neutralized solid polycarboxylic acid powder may be a partially neutralized tricarboxylic acid where the tricarboxylic is, for example, citric acid or a partially neutralized alpha hydroxycarboxylic acid where the alpha hydroxycarboxylic is, for example, tartaric acid. The solid polycarboxylic acid powder used to produce the partially neutralized polycarboxylic acid powder may be selected from the group consisting of the following acids: adipic acid, aldaric acid, citric acid, isocitric acid, tartaric acid, oxalic acid, malonic acid, maleic acid, itaconic acid, succinic acid, glutaric acid, pimelic acid, suberic acid, azelaic acid, sebacic acid, phthalic acid, aconitic acid, propane-1,2,3 tricarboxylic acid, and trimesic acid. Further, the polymeric acids (PAA and PMA) may also be partially neutralized.

As previously indicated, generally these acids will have a pKa of about 2 to about 7.5, more likely 3 to about 7, and many particularly suitable acids have a pKa of 4.2 to 6. One particularly suitable acid for use in the present invention is partially neutralized citric acid such as sodium monocitrate.

The method of forming the crosslinked cellulose ether with the powdered acid for use in the present invention is not limited to a particular method. For example, the dry powdered acid can simply be combined together with the crosslinked cellulose ether. Preferably, the acid will have a relatively small particle size to allow it to be evenly distributed throughout the cellulose ether. Generally an average particle size of less than 100 microns and preferably less than 50 microns is suitable for use in the present invention. The powdered acid can be combined with the cellulose ether by other methods such as spray drying and, further, can be added at any suitable processing step during the formation of the cellulose ether, as well as the crosslinking of the cellulose ether. Acids soluble in organic solvents such as PAA can be dissolved in an organic solvent and added to the cellulose ether powder. The solvent is then evaporated. Thus, the present invention should not be limited to any particular method of making this powder blend.

The powder blend of the present invention can be used in any manner that a water-soluble cellulose ether is used. Generally, it can be added directly to a water-based system under agitation. This will allow the cellulose ether to disperse throughout the water and then subsequently dissolve in the water to provide a lump-free water-based system. Further, the powder blend can be added at any suitable step during the formation of the water-based system. For example, it can be added as a dry powder to the grind of a paint formulation and subsequently combined with water. Some or all components of a water-based system can be coated onto the cellulose ether powder by using any typical powder processing method if desired. The cellulose ether powder of the present invention is particularly suited for addition to water-based systems that have a viscosity greater than the viscosity of water, such as a paint formulation, other emulsions used in food preparation, personal care products and others.

The method of use of the present invention will be further appreciated in light of the following examples.

The examples are presented to illustrate the invention, parts and percentages being by weight, unless otherwise indicated.

EXAMPLES

The examples presented herein were generated on 300 g scale using water-based solutions such as architectural paint formulation, polymer solutions, or buffered water solutions. The extent of cellulose ether dissolution was deduced from torque values generated by Haake VT550 viscometer that provides mixing while acquiring torque readings.

Figures shown herein illustrate the benefit of the claimed invention and show the changes in torque with time as the water soluble polymer dissolves. The conventional addition protocol involved pre-slurring the water soluble polymer in water prior to addition to the water-based solution is presented. As a negative control, i.e. the dissolution of directly added water soluble polymer without the partially neutralized solid carboxylic acid is presented. Finally, the water soluble polymer powder blend of the invention is presented.

Figure 2:
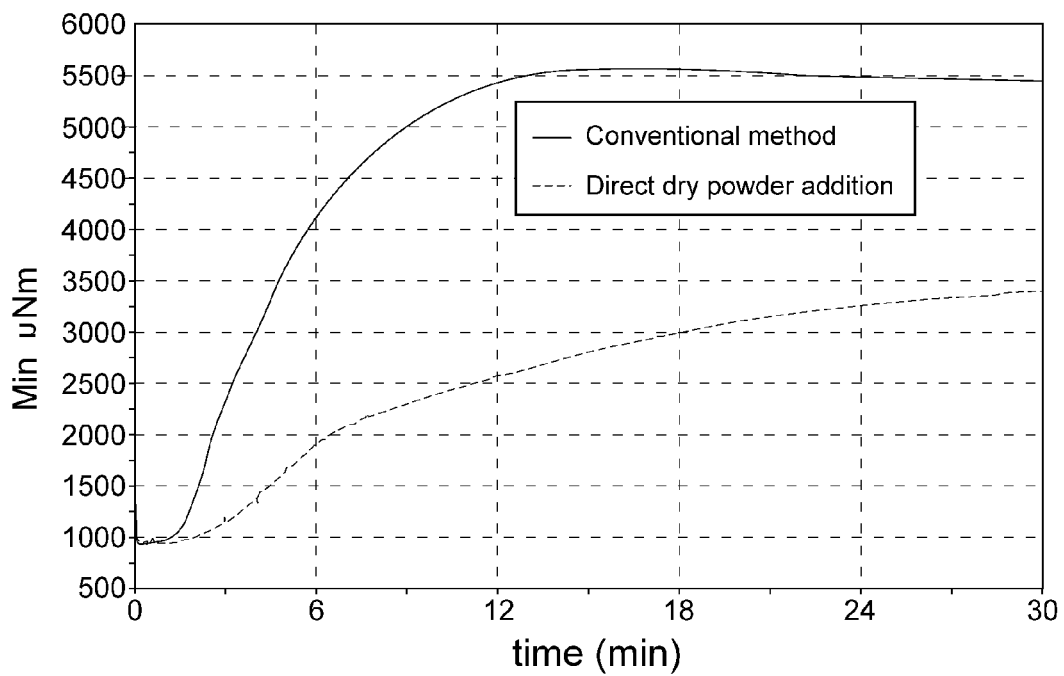
FIG. 2 is a graph which illustrates dissolution over time of glyoxalated HEC added to un-thickened paint (i.e. no rheology modifier added) by conventional method or directly adding the HEC as a dry powder.
Figure 3:
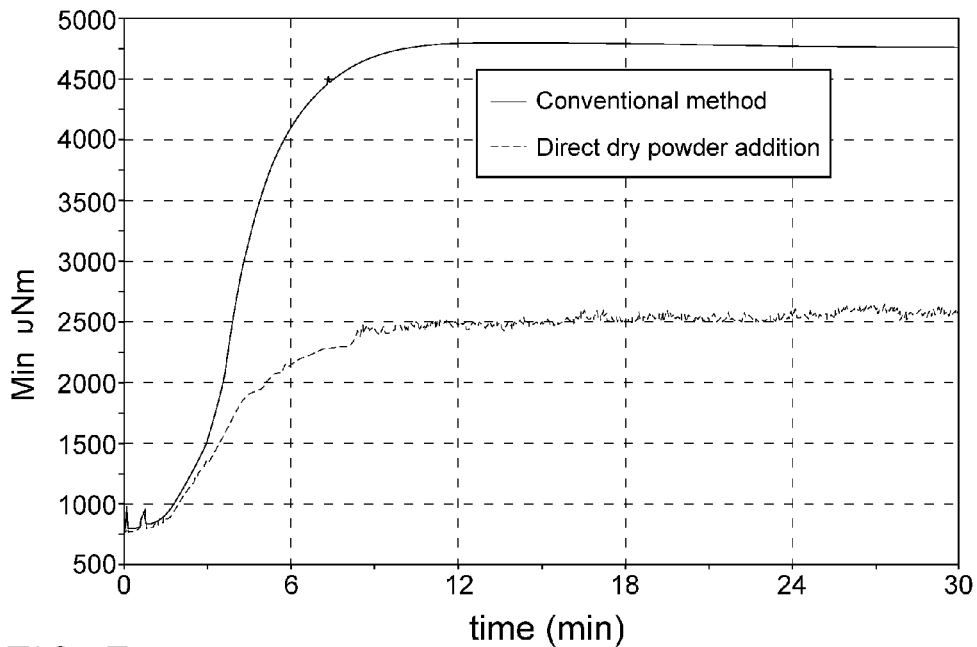
FIG. 3 is a graph which illustrates dissolution over time of glyoxalated HEC added to pH 8.5 buffered solution containing pre-dissolved 0.3 wt % of the said polymer by conventional method or directly adding the HEC as a dry powder.

FIGS. 1 through 3 illustrate comparative examples where the technical challenge of dissolving a water-soluble polymer in water is demonstrated. FIG. 1 illustrates that glyoxalated HEC, (Natrosol® 250HXR hydroxyethylcellulose, available from Hercules Incorporated) dissolved lump free in buffered water at pH 8.5 (100 mM Tris buffer) regardless of how it was added, i.e. directly as a dry powder or conventionally by pre-slurring. FIGS. 2 and 3 illustrate that the same does not hold true when the glyoxalated HEC was added to a more viscous water-based systems such as an un-thickened architectural paint, pH 8.5 (FIG. 2) or 0.3 wt % HEC solution in pH 8.5 Tris buffer (FIG. 3). The poor dissolution of directly added HEC was manifested by lower torque values and was caused by the polymer lumping. This illustrated lumping phenomenon is not limited to paints or polymer solutions but rather can be generalized to water-based systems with viscosity exceeding the viscosity of water and having pH above 7.

Figure 4:
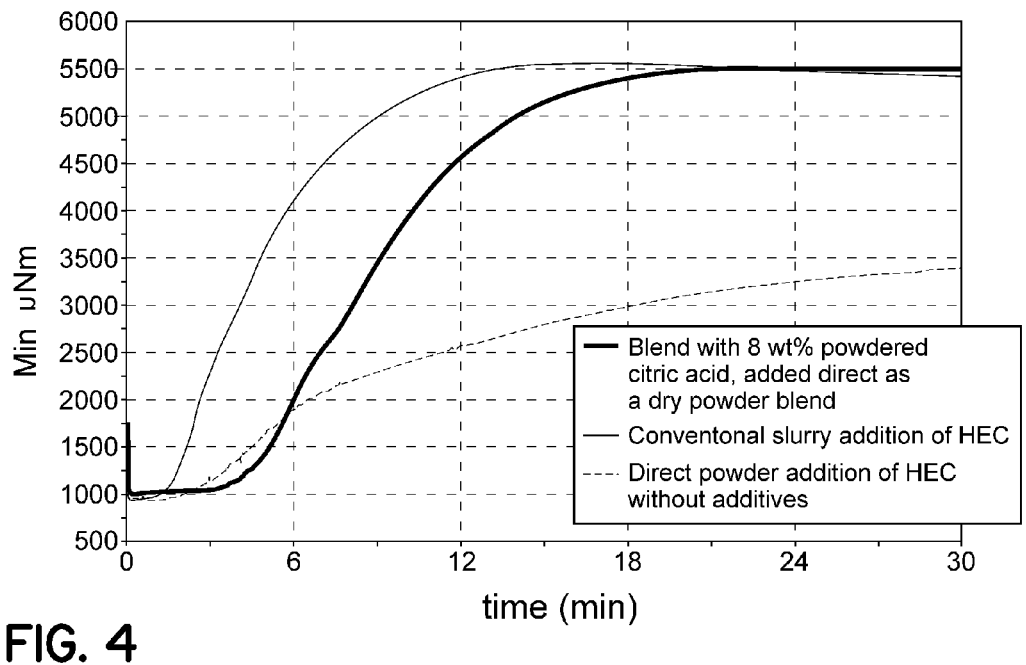
FIG. 4 is a graph which illustrates dissolution over time of glyoxalated HEC in un-thickened paint, a glyoxalated HEC blend with 8 wt % powdered citric acid, added direct as a dry powder blend, a conventional slurry addition of HEC (as is), or a direct powder addition of HEC without additives.

FIG. 4 illustrates a comparative example having an improved performance of a glyoxalated HEC blend with 8 wt % (based on the total weight) of powdered citric acid. The blended material readily dissolved in paint formulation without lumps.

Figure 5:
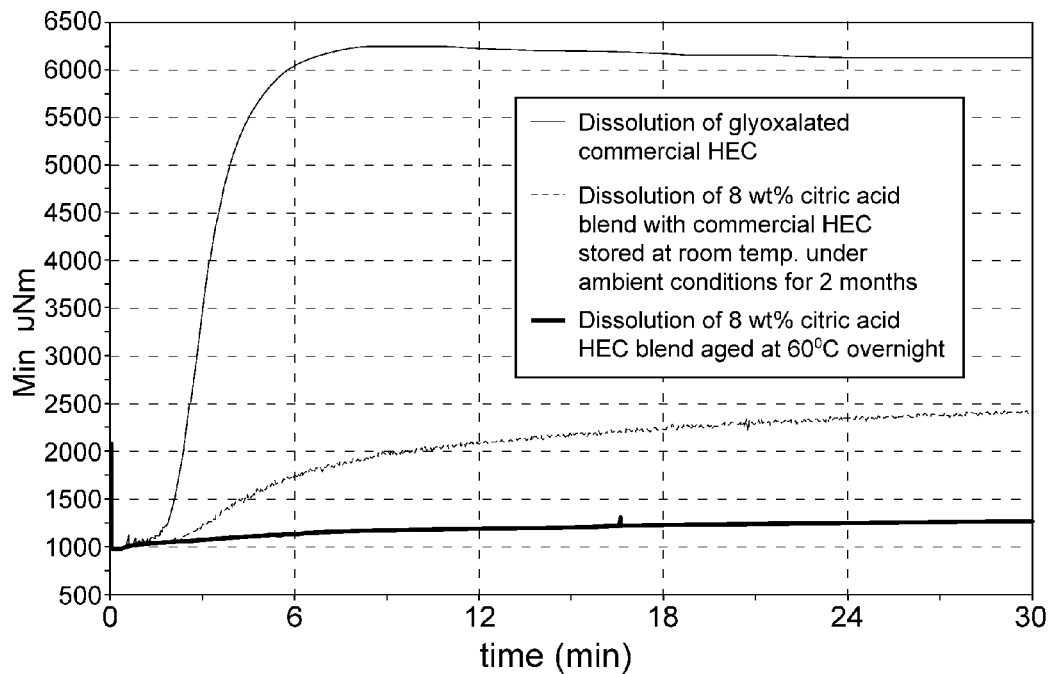
FIG. 5 is a graph which illustrates the shelf stability of glyoxalated HEC blends with citric acid where dissolution over time of the blend when initially produced, when stored at ambient conditions for 2 months; and when aged overnight at 60° C. is shown.

The powder blend of glyoxalated HEC with citric acid, however, was found to have unacceptable solubility stability. The instability manifested in a worsening of HEC dissolution as illustrated in FIG. 5. The dissolution of HEC powder without aging, the blend stored at room temperature for 2 months and the blend aged overnight at 60° C. are found in FIG. 5. The worsening of dissolution with aging was evident and, while not wishing to be bound by theory, was attributed to cross-linking esterification reaction between HEC and the carboxylic groups of the citric acid.

Example 1

A dry blend was prepared using hydroxyethylcellulose (Natrosol® 250HXR hydroxyethylcellulose available from Hercules Incorporated) and 8 wt % of powdered monosodium citrate (on the total weight basis). The blend was aged in 60° C. oven over 10 days. The subsequent dissolution of the said blend in 100 mM Tris buffer solution at pH 8.5 exhibited dissolution similar to the dissolution of commercial Natrosol® 250HXR.

Figure 6:
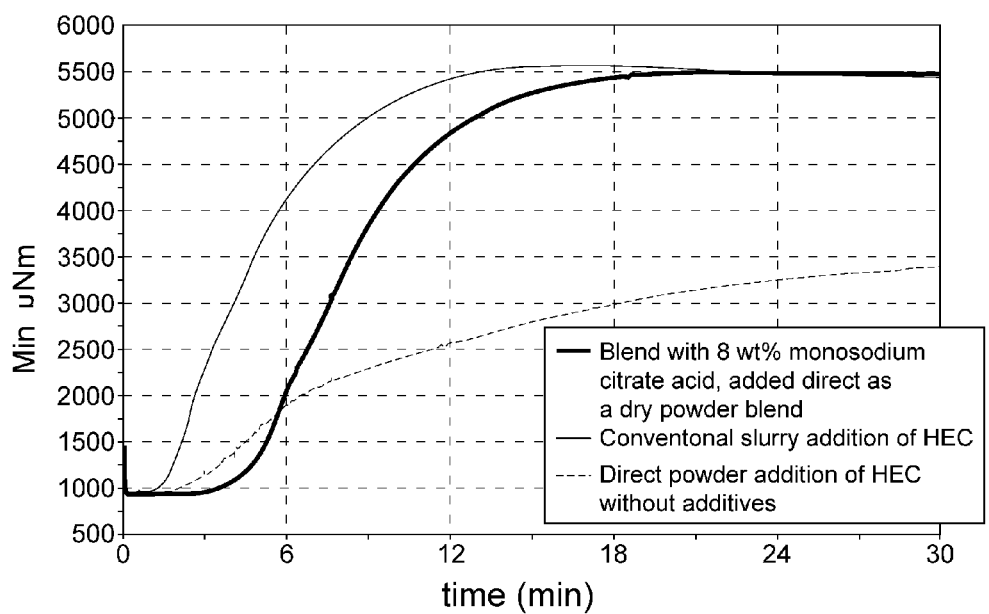
FIG. 6 is a graph which illustrated the dissolution over time of glyoxalated HEC in un-thickened paint when blended with 8 wt % monosodium citrate when added directly as a dry powder blend, as a conventional slurry addition of HEC (as is), or as a direct powder addition of HEC without the 8 wt % monosodium citrate.

Surprisingly, it was found that blending glyoxalated HEC with a partially neutralized powdered carboxylic acid delivered the desired benefit of lump free dissolution with good solubility stability, as defined by the viscosity of the glyoxalated HEC being substantially unaffected by aging when compared to samples of the glyoxalated HEC with powdered citric acid. FIG. 6 illustrates the performance of the blend of the present invention and illustrates that the blend delivers lump free dissolution.

Example 2

A dry blend was prepared using hydroxyethylcellulose (Natrosol® 250HXR hydroxyethylcellulose available from Hercules Incorporated) and 6 wt % of monosodium citrate powder having an average particle size of 50 μm. The blend was added as a dry powder to a water-based paint formulation, pH 8.5, described in Table 1 in the amount corresponding to 0.48 wt % of the total paint weight basis. The dissolution was carried out in 8 oz jar using 1½" diameter marine propeller type blade at 300 RPM. The dry blend readily dissolved bringing the paint viscosity to 97 KU.

TABLE 1

Paint formulation

| Pigment Grind | Wt. % |
|---|---|
| Base Paint | |
| Distilled Water | 28.1 |
| Nuosept 95 | 0.3 |
| Tamol 731A | 0.7 |
| Igepal CO-660 | 0.3 |
| Igepal CO-897 | 0.4 |
| AMP-95 | 0.2 |
| Propylene Glycol | 2.0 |
| Rhodeline 640 | 0.2 |
| Water, Discretionary | 15.7 |
| Ti-Pure R-931 TiO2 | 3.2 |
| ASP NC Clay | 12.2 |
| #10 White Calcium Carbonate | 8.7 |
| Celite 281 | 1.7 |
| -Disperse To Hegman 4 to 5- | |
| -Add all discretionary water- | |
| Letdown | |
| Ucar Latex 379G | 23.2 |
| Texanol | 1.3 |
| Rhodeline 640 | 0.3 |
| Propylene Glycol | 1.5 |
| Thickened Paints (grams) | |
| Base Paint | 220.0 |
| Thickener | 50.0 |
| Water | |
| Total | 270.0 |

Example 3

A dry blend was prepared using hydroxyethylcellulose (Natrosol® 250HBR hydroxyethylcellulose available from Hercules Incorporated) and 10 wt % of monosodium citrate powder having an average particle size of 50 μm. The blend was added as a dry powder to 0.3 wt % hydroxyethylcellulose solution (Natrosol® 250HXR hydroxyethylcellulose available from Hercules Incorporated) prepared in 100 mM Tris buffer at pH 8.5. The blend was added directly as a dry powder under the mixing conditions described in Example 2. The addition of the blend produced readily soluble, lump-free solution.

Example 4

A hydroxyethylcellulose (Natrosol® 250HXR hydroxyethylcellulose available from Hercules Incorporated) was dry blended with 8 wt % of monosodium citrate with particle size of 50 μm. A commercial paint formulation with a viscosity of 110 KU and pH 9.7 was obtained. The paint formulation was diluted 10 wt % with water that lowered paint viscosity to 100 KU. The blend in the amount of 0.075 wt % of the total paint mass of 2,350 grams was added to the diluted paint to simulate viscosity post adjustment in paint manufacturing process. The blend was added directly onto the surface of the mixing paint as a dry powder. The mixing was carried out in 2 L glass jar, using an overhead stirrer consisting of two pitch turbine blades, each at 7.6 cm in diameter, rotated at 300 RPM. The added dry blend fully dissolved without lumps and brought paint viscosity to 107 KU.

Example 5

Figure 7:
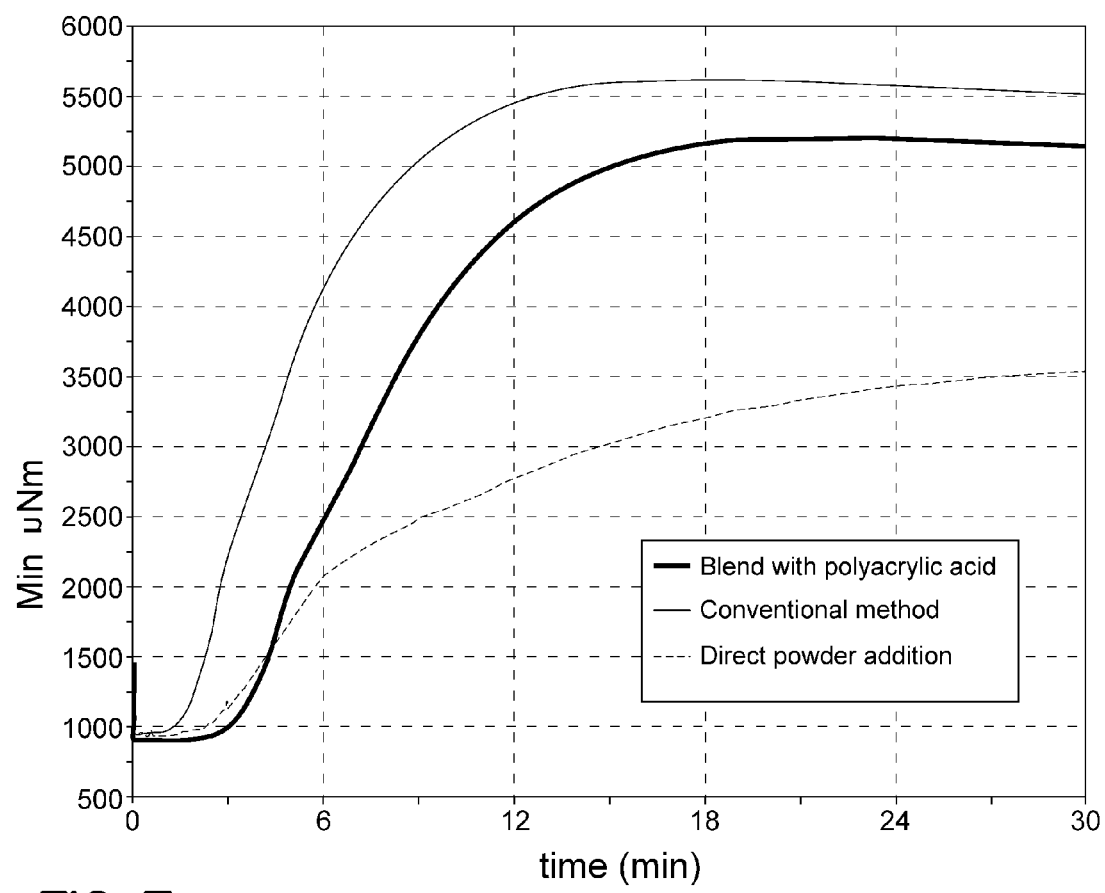
FIG. 7 is a graph illustrating commercial HEC added as a slurry and dry compound compared to the present invention utilizing polyarylic acid.

A hydroxyethylcellulose (Natrosol® 250HXR) was treated with polyacrylic acid, MW 1800. The following procedure was employed. Polyacrylic acid was first solubilized in acetone to produce 5 wt % solution. The solution was them mixed with hydroxyethylcellulose, then dried in a fluid bed dryer. The resulting powder was added dry to un-thickened 70PVC paint (Table 1) and polymer dissolution followed using Haake viscometer at 300 RPM. As shown in FIG. 7, the composition readily dissolved lump-free. For comparison, FIG. 7 contains the dissolution profiles of commercial hydroxyethylcellulose added as a slurry and dry, with the latter extensively lumping.

While the invention has been described with respect to specific embodiments, it should be understood that the invention should not be limited thereto and that many variations and modifications are possible without departing from the spirit and scope of the invention.

What is claimed is:

1. A storage stable cellulose ether formulation which disperses in water without forming lumps, comprising:
   a) a cellulose ether at least partially crosslinked with a crosslinker having a first reactive moiety and a second reactive moiety, wherein said first reactive moiety is an aldehyde and said second reactive moiety is selected from the group consisting of aldehyde, silanol, isocyanate, halomethyl, alkyl tosylate ether, epoxide, and combinations thereof; and
   b) a solid water soluble acid selected from the group consisting of amino acids, partially neutralized polycarboxylic acids, and combinations thereof, wherein said solid water soluble acid has a pKa of 4.2 to 6 and is present in the storage stable cellulose ether formulation in a range of from more than 1 to about 20 wt % of the formulation.

2. The formulation of claim 1, wherein said cellulose ether is selected from the group consisting of hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methylcellulose (MC), methylhydroxypropyl cellulose (MHPC), methylhydroxyethyl cellulose (MHEC), carboxymethylmethylcellulose (CMMC), hydrophobically modified carboxymethylcellulose (HMCMC), hydrophobically modified hydroxyethyl cellulose (HMHEC), hydrophobically modified hydroxypropyl cellulose (HMHPC), hydrophobically modified ethylhydroxyethyl cellulose (H M EH EC), hydrophobically modified carboxymethylhydroxyethyl cellulose (HMCMHEC), hydrophobically modified hydroxypropylhydroxy ethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC).

3. The formulation of claim 1, wherein said partially neutralized polycarboxylic acid is selected from the group consisting of adipic acid, aldaric acid, citric acid, isocitric acid, tartaric acid, oxalic acid, malonic acid, maleic acid, itaconic acid, succinic acid, glutaric acid, pimelic acid, suberic acid, azelaic acid, sebacic acid, phathalic acid, aconitic acid, propane- 1,2,3 tricarboxylic acid, trimethic acid, polyacrylic acid, polymethacrylic acid, and combinations thereof.

4. The formulation of claim 3, wherein said partially neutralized polycarboxylic acid is partially neutralized citric acid.

5. The formulation of claim 1 containing from about 0.01 to about 8 weight percent of said crosslinker.

6. The formulation of claim 5 containing from about 0.01 to 5 weight percent of said crosslinker.

7. The formulation of claim 1 comprising 50 to 99 weight percent of said crosslinked cellulose ether.

8. The formulation of claim 1, wherein said crosslinker comprises glyoxal.

9. The formulation of claim 1, wherein said partially neutralized polycarboxylic acid is capable of providing said crosslinked cellulose ether solubility stability after being stored at a temperature of 60° C. for at least 3 days.

10. The formulation of claim 1, wherein said partially neutralized polycarboxylic acid is capable of providing said crosslinked cellulose ether solubility stability after being stored at a temperature of 60° C. for at least 10 days.

11. The formulation of claim 1, wherein solid water soluble acid is monosodium citrate.

12. A method of thickening a water-based system comprising, adding a desired amount of a dry blend to a water-based system, said dry blend comprising:
  (a) 50 to about 99 weight percent of an at least partially crosslinked cellulose ether comprising 0.01 to about 8 weight percent of a crosslinker having a first reactive moiety and a second reactive moiety, wherein said first reactive moiety is an aldehyde and said second reactive moiety is selected from the group consisting of aldehyde, silanol, isocyanate, halomethyl, alkyl tosylate ether, epoxide, and combinations thereof; and
  (b) from more than 1 to about 20 weight percent of an acid selected from the group consisting of partially neutralized polycarboxylic acids, amino acids, and combinations thereof, wherein said acid has a pKa of 4.2 to 6.

13. The method of claim 12, wherein said crosslinker is glyoxal.

14. The method of claim 12, wherein said water-based system is a paint.

15. The method of claim 14, wherein said dry blend is added to a pigment grind.

16. The method of claim 12, wherein the acid is monosodium citrate.

17. A storage stable cellulose ether formulation which disperses in water without forming lumps comprising:
  a) an at least partially crosslinked cellulose ether, wherein said at least partially crosslinked cellulose ether comprises a crosslinker having a first reactive moiety and a second reactive moiety, wherein said first reactive moiety is an aldehyde and said second reactive moiety is selected from the group consisting of aldehyde, silanol, isocyanate, halomethyl, alkyl tosylate ether, epoxide, and combinations thereof; and
  b) a partially neutralized polycarboxylic acid selected from the group consisting of adipic acid, aldaric acid, citric acid, isocitric acid, tartaric acid, oxalic acid, malonic acid, maleic acid, itaconic acid, succinic acid, glutaric acid, pimelic acid, suberic acid, azelaic acid, sebacic acid, phathalic acid, aconitic acid, propane- 1,2,3 tricarboxylic acid, trimethic acid, and combinations thereof, wherein said partially neutralized polycarboxylic acid is present in the storage stable cellulose ether formulation in a range of from more than 1 to about 20 wt % of the formulation.

18. The formulation of claim 17, wherein the partially neutralized polycarboxylic acid is monosodium citrate.

* * * * *